April 6, 1965
E. A. HEDIGER
3,176,512
MACHINE FOR RUNNING GEAR FOR TESTING OR FINISHING
Filed June 26, 1961
2 Sheets-Sheet 1
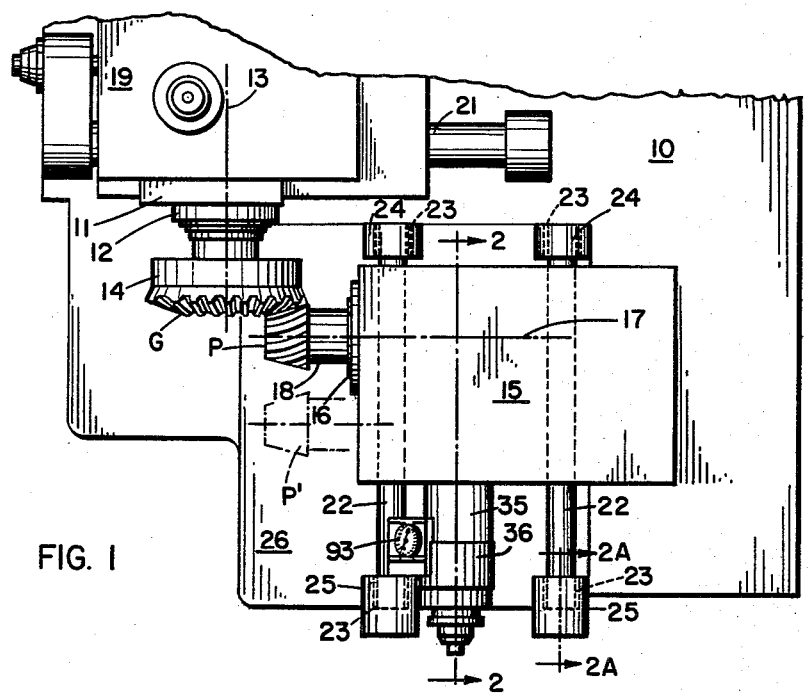
FIG. 1
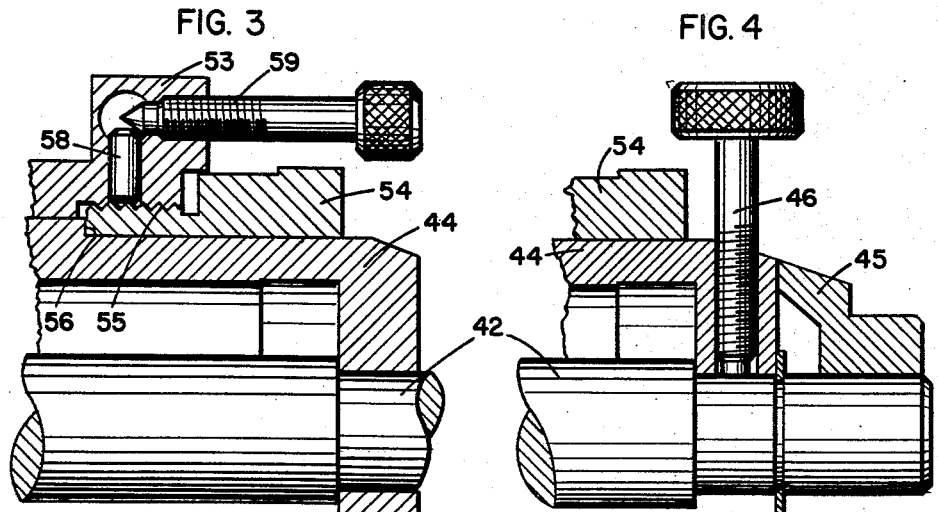
FIG. 3
FIG. 4
INVENTOR.
EDWIN A. HEDIGER
BY
Richard W. Treverton
ATTORNEY April 6, 1965  E. A. HEDIGER  3,176,512
MACHINE FOR RUNNING GEAR FOR TESTING OR FINISHING
Filed June 26, 1961  2 Sheets-Sheet 2

United States Patent Office 3,176,512
Patented Apr. 6, 1965

3,176,512
MACHINE FOR RUNNING GEARS FOR
TESTING OR FINISHING
Edwin A. Hediger, Rochester, N.Y., assignor to The
Gleason Works, Rochester, N.Y., a corporation of New
York
Filed June 26, 1961, Ser. No. 119,579
16 Claims. (Cl. 73—162)

The present invention relates to a machine for running pairs of gears together for testing or for finishing by abrasion, such as by lapping, honing or burnishing; and has particular relation to means for moving one member of the pair between a loading position and a running position. A main objective is a means of this kind adapted to bring the gears into mesh without backlash quickly but under light load, after which they may then be moved apart by a preselected distance in order to provide backlash.

A machine according to the invention has a pair of spindles each adapted to support one gear of a pair to be run together on the machine, and means supporting one spindle for motion relative to the other in one direction, to bring the gear carried thereby into a position of mesh with the other gear, and in the opposite direction, away from said position of mesh, said means comprising a support, a guide movable on the support in said directions, a spindle head journaling said one spindle and movable on the guide in said directions, first and second reversible motors for effecting said movements of the guide and the head respectively, said motors being arranged for reaction against the support and the second motor having limited motion relative to the support, and means operable by the second motor at the limit of the stroke in said one direction for reversing the first motor to cause the latter to effect terminal motion of the head in said one direction as a unit with the guide and the second motor.

In the preferred embodiment shown in the accompanying drawings, FIG. 1 is a fragmentary plan view of the machine;

FIGS. 3 and 4 are detail sectional views in different planes containing the adjustment shaft shown in FIG. 2.

Figure 2:
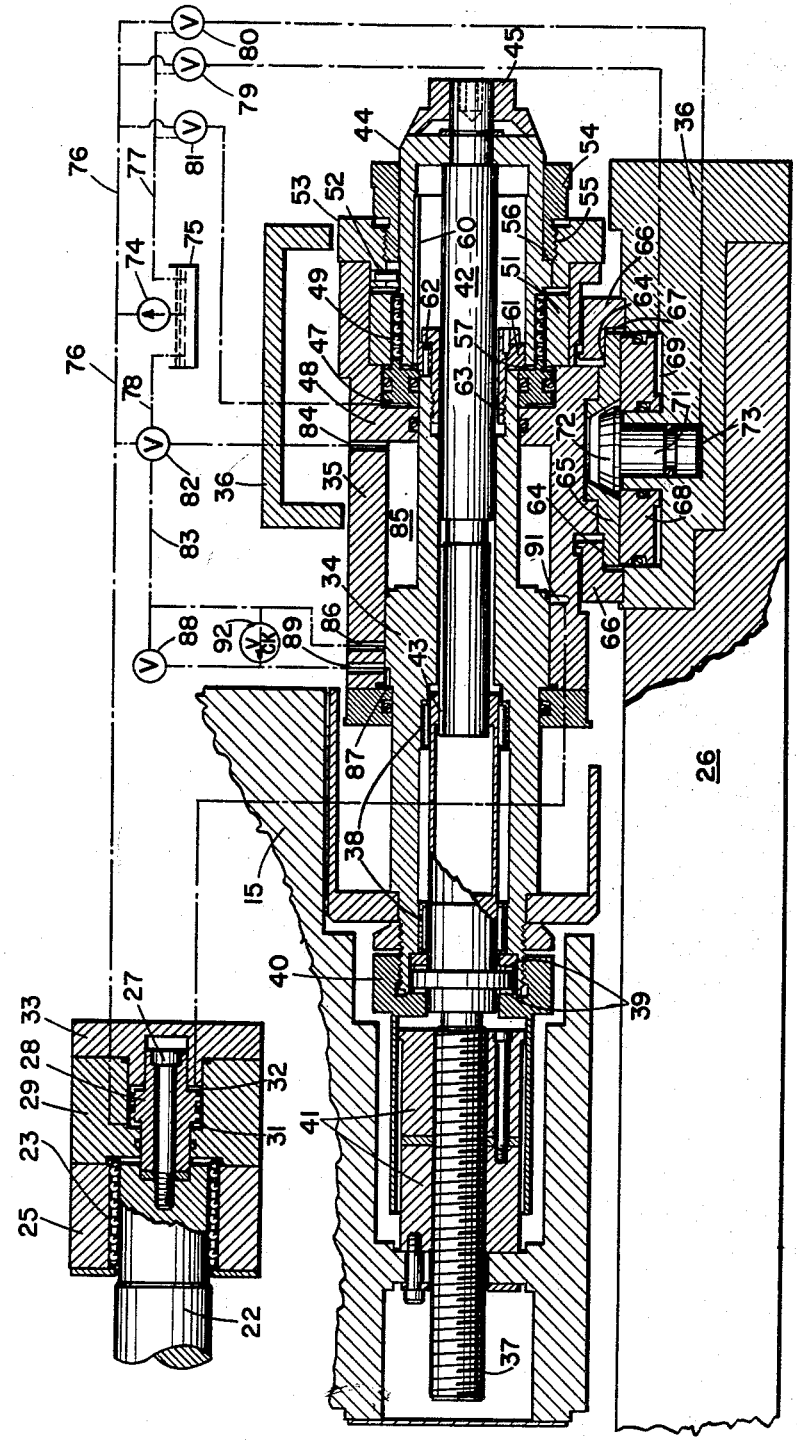
FIG. 2 is a sectional view in planes 2—2 and 2A—2A of FIG. 1.

Referring to FIG. 1, the machine comprises a frame 10 on which is mounted a gear head 11 journaling a spindle 12 for rotation about horizontal axis 13, the spindle being provided with a suitable chuck or arbor 14 for holding a bevel or hypoid gear G. The frame also supports a pinion head 15 which journals a spindle 16 for rotation about horizontal axis 17, this spindle having a chuck 18 for a pinion P that is to be run in mesh with gear G. The pinion head supports a reversible motor, not shown, for driving the spindle in either direction, to thereby run the gears together; and the gear head carries a suitable brake, not shown, for imposing a drive load on the gears.

The gear head 11 is adjustable vertically on a column 19 which itself is adjustable horizontally, parallel to pinion axis 17, along two parallel guide rods 21 on the frame, only one of which appears in the drawings. These two adjustments adapt the machine for gears G and P having different vertical spacings of axes 13 and 17, and for gears G of different diameters. The pinion head 15 is movable horizontally on parallel guide rods 22 to carry the pinion P between (a) a loading position indicated at P', (b) a position wherein it meshes the gear G without backlash, and (c) the running position wherein it meshes the gear with a selected amount of backlash. The pinion head is also adjustable along rods 22 to adapt the machine for pinions of different diameters.

The major portion of the pinion head's motion is frictional sliding motion upon and relative to the guide rods 22, but the final movement which carries the pinion into mesh with the gear, without backlash, is by movement of the rods 22 relative to the frame. For this purpose the ends of these rods are supported on ball type linear motion anti-friction bearings 23, FIG. 1 and upper left of FIG. 2, which are mounted in bolsters 24 and 25 on a support plate 26 carried by the frame. In the particular machine illustrated the support plate is movable horizontally on the frame for effecting relative small displacements of the gears, but insofar as concerns the present invention the plate may be considered as a stationary part of the frame.

Secured to each guide rod 22 by a screw 27 is a piston 28 operating in a cylinder 29 secured to the related bolster 25. The pistons are so formed that their effective areas in inner cylinder chambers 31 are slightly less than their areas in outer cylinder chambers 32, so that when fluid under the same unit pressure is applied to both chambers the rods will be moved inwardly on the ball bearings 23 under a light pressure which may be less than that required to slide the head 15 on the rods 22. The unit pressure is preferably such that when chambers 32 are on exhaust, the pistons 28 and rods 22 will be moved to their right limit positions against frictional resistance imposed upon the rods by head 15. The light pressure is wanted for the final inward motion of the pinion P into zero backlash mesh with the gear G because a heavy impact could easily damage the tooth surfaces. The preceding and following longer motions of the head 15 on the rods 22, from loading position and return thereto, occur when pressure in chambers 32 is released, so that pressure in chambers 31 is holding the rods in their outer limit positions wherein the pistons abut cylinder heads 33.

These longer motions of the head 15 are effected hydraulically by a piston 34, FIG. 2, operating in a cylinder 35 which at times is secured to a member 36 rigid with plate 26 and at other times is allowed limited motion relative thereto in a direction parallel to piston 34 and rods 22. A screw 37 coaxial of the piston is rotatable therein on radial needle bearings 38 and axial-thrust needle bearings 39, the latter acting against a flange on the screw and being held in assembly by a nut 40 screw-threaded to the inner end of the piston. The screw 37 is threaded into a multi-part nut 41 secured to the head 15. A screw-adjusting shaft 42 is splined to the screw at 43 for relative axial motion and is rotatable in a non-rotatable sleeve 44. The screw may be rotated by means of a suitable end wrench, not shown, applied to the outer end of shaft 42, to adjust the head along rods 22 for adapting the machine for pinions P of different diameters. Such adjustment is facilitated by cooperating graduations on the sleeve 44 and on a dial 45 secured to the shaft. After such adjustment the shaft may be clamped to the sleeve by a set screw 46, FIG. 4.

An annular piston 47, hereinafter called the backlash piston, is slidable on the right stem of piston 34 and has a limited stroke in cylinder 35 between wall 48 of the latter and the inner end of sleeve 44. The length of this stroke, which determines the amount of withdrawal of the pinion P from zero backlash mesh with the gear G, to establish backlash, is adjustable by axial movement of the sleeve 44. The sleeve is supported for such movement on a ball-sleeve bearing 49 in a bushing 51 secured in cylinder 35; and the sleeve 44 is held against rotation in this bearing by a key pin 52 which is carried by the head 53 of the cylinder 35 and extends into a keyway in the sleeve 44. A tubular adjusting screw 54 for the sleeve is threaded at 55 to cylinder head 53 and abuts shoulder 56 of the sleeve. By rotating the screw 54 the outward (right) limit position of the sleeve may be adjusted, to thereby adjust the clearance at 57, which represents the stroke of backlash piston 47. To facilitate such adjustment suitable graduations are applied to the adjacent surfaces of screw 54 and cylinder head 53. After adjustment the screw is locked by means of a soft metal pin 58 which is cammed against the screw threads by a set screw 59, FIG. 3. For holding the piston 34 against rotation, a ring 61 has a keyway engaging key 60 of sleeve 44. The ring 61 is secured to the piston 34 by a pin 62 and a tubular screw 63 which also is pinned to the ring.

For holding the cylinder 35 to the member 36, horizontal surfaces 64 of a plate 65 secured to the bottom of the cylinder are slidably engaged with a gib 66 secured to member 36. A substantial clearance 67 between vertical abutment surfaces of the plate and gib allows the cylinder limited motion relative to member 36 in a direction parallel to rods 22 and shaft 42. The cylinder may be held in any position of such motion by an annular clamp piston 68. The latter is arranged to operate in a vertical annular bore in member 36, and, upon application of hydraulic pressure to cylinder chamber 69, clamp surfaces 64 of plate 65 to the gib 66. A centering piston 71 operable in a cylinder bore in member 36 has a conical head 72 for engagement in a conical bore through plate 65. Application of hydraulic pressure to chamber 73 beneath piston 71, at a time when clamp 68 is released, raises the piston 71 and thereby causes head 72 to cam the plate 65 (and the cylinder 35) forwardly or rearwardly along rods 22 to a definite position relative to member 36 and plate 26.

Referring to FIG. 2, the hydraulic system of the machine includes a motor operated pump 74 which receives fluid from sump 75 and delivers it to a pressure line 76, return to the sump being through line 77 or 78. A valve 79 serves to connect clamp chamber 69 either to pressure line 76 or return line 77. Similarly a valve 80 operates to connect centering chamber 73 either to pressure line 76 or return line 77; and a valve 81 serves to connect the backlash chamber, at the left of piston 47, to either the pressure line or the return line. A reversing valve 82 serves to connect either line 76 or 78 to a line 83 and the other one thereof to a port 84 opening into the chamber 85 at the right of piston 34. Line 83 communicates with a port 86 which opens into cylinder chamber 87 at the left of piston 34 when the latter has moved to the right, but is closed by the piston, as it moves to the left, at a point before the pinion P could have contact with gear G. A spring or pressure closed jogging or inching valve 88 may be opened manually to allow flow at a restricted rate to line 83 from another port, 89, which opens into chamber 87. Another port in cylinder 35, designated 91, is uncovered by piston 34 as the latter reaches its limit position to the left, determined by abutment of ring 61 with backlash piston 47. Port 91 communicates with cylinder chambers 32, and the opposite cylinder chambers, 31, are connected to pressure line 76. A check valve 92 prevents flow from port 89 to line 83, but allows opposite flow.

To set up the machine for repetitive testing of gear pairs of the same design, a pair of master gears, or equivalent gages, are chucked on the spindles 12 and 16; valve 80 is operated to apply centering piston 71, 72; and valves 79 and 81 are operated to put both the clamp chamber 69 and the backlash chamber on exhaust. Valve 82 is then operated to apply pressure to chamber 85 and thereby move piston 34 to the left, fluid exhausting from chamber 87 through port 86 until the latter is covered by the piston, arresting the motion. Then by operation of jogging valve 88, allowing exhaust of fluid through port 89, the motion of the piston may be resumed and continued until the pinion reaches the limit position determined by abutment of ring 61 with piston 47. The shaft 42 and screw 37 are then rotated to advance head 15 sufficiently to bring the gears into mesh without backlash. A dial type indicator gage 93, FIG. 1, provided for the purpose of showing the departure of cylinder 35 from its centered position established by piston 71, 72, is adjusted to read zero. This gage, mounted on member 36, has its actuating stem in abutment with a plane surface of cylinder 35 perpendicular to rods 22. Valves 80 and 82 are now reversed to release the centering piston and to withdraw the head 15; and the master gears are removed.

When, now, a pair of gears G and P to be run together are chucked on the machine, the valve 82 is operated to apply pressure to chamber 85 and place chamber 87 on exhaust. Since port 91 now opens into chamber 87 the chambers 32 are also on exhaust, so that pressure in chambers 31 will immediately move pistons 28 and guide rods 22 to their right limit positions in the event they are not already there. Due to the mass of head 15 the pressure in chamber 85 first moves cylinders 35 to the right in FIG. 2, until the clearance at 67 is eliminated, and then the piston 34 and head 15 are moved to the left, until port 86 is closed. Then by operation of jogging valve 88 the motion of the piston and head is continued until terminated by abutment of ring 61 with backlash piston 47. During the last portion of this motion, the port 91 is uncovered by piston 34, so that hydraulic pressure is applied to cylinder chambers 32. Pistons 28 acting under the slight difference in total pressure applied in chambers 32 and 31, slowly move to the left the entire unit that is supported by ball bearings 23, comprising rods 22, head 15, piston 34 and cylinder 35, until the pinion P engages the gear G without backlash, arresting the motion. Valve 79 is now actuated to apply clamp 68. Gage 93 at this time indicates any dimensional difference between the gears on the machine and the master gears insofar as concerns gear mounting position, and this information may be recorded for use in final assembly of the gears. Valve 81 is operated to apply pressure to the chamber at the left of backlash piston 47, so that the latter moves to the right until clearance 57 is eliminated. This withdraws the head 15 by the amount selected by a preceding adjustment of screw 54, and thus relatively positions the gear and pinion for running together with the intended backlash despite slight dimensional differences which may exist between them and the master gears. In connection with this withdrawal action it is mentioned that the effective area of backlash piston 47 is greater than the effective area of piston 34 in chamber 85 plus the difference between the effective areas of pistons 28 in chambers 31 and 32.

After the gears have been run, valve 82 is reversed to place chambers 32 and 85 on exhaust, and to apply pressure to chamber 87. This pressure, together with that present in chambers 31, allows return of guide rods 22 to the right and moves piston 34 to its right limit position, to thereby return the head 15 to loading position. Valve 79 is operated to release clamp 68 and valve 81 to place the backlash cylinder chamber on exhaust, readying the machine for repetition of the cycle after another pair of gears G and P has been mounted.

From the foregoing it will be understood that in operation of the machine in the manner intended the piston 34, by reason of its large effective area, may quickly advance the head 15 from loading position, but that it reaches the limit of its inward stroke before the gears G and P come into engagement without backlash; that such metal-to-metal engagement of the gears occurs only under the relatively much lighter force exerted by the pistons 28; and that these pistons 28 in effecting the terminal inward motion of the head 15 carry along with the head, as a unit therewith, both the piston 34 and the cylinder 35. Thus the pistons 28 and their cylinders 29 in effect constitute a yieldable or non-positive means for urging the head 15 to its inward terminal position, enabling this position to vary in accordance with dimensional departures of the gears on the machines from standard.

Having now described the preferred machine embodiment and its operation, what is claimed as the invention is:

1. A machine having a pair of spindles each adapted to support one gear of a pair to be run together on the machine, and means supporting one spindle for motion relative to the other in one direction, to bring the gear carried thereby into a position of mesh with the other gear, and in the opposite direction, away from said position of mesh, said means comprising a support, a guide movable on the support in said directions a spindle head journaling said one spindle and movable on the guide in said directions, first and second reversible motors for effecting said movements of the guide and the head respectively, said motors being arranged for reaction against the support and the second motor having limited motion relative to the support, and means operable upon the second motor reaching the limit of its stroke in said one direction for reversing the first motor to cause the latter to effect terminal motion of the head in said one direction as a unit with the guide and the second motor.

2. A machine according to claim 1 having a clamp for securing the second motor to the frame at the conclusion of such terminal motion, and means for operating the second motor reversely through a limited stroke to withdraw the head from its terminal position to establish backlash between the gears.

3. A machine according to claim 2 in which the second motor comprises a cylinder and a piston, and the last-mentioned means comprises an auxiliary piston arranged to variably limit the stroke of the first-mentioned piston.

4. A machine according to claim 3 having means for adjusting the stroke of the auxiliary piston to thereby adjust the stroke of said withdrawal of the head from its terminal position.

5. A machine according to claim 1 in which each of said motors comprises a piston and cylinder, and said means for reversing the first motor comprises a port in the cylinder of the second motor which is uncovered by the piston of the second motor at the limit of its stroke in said one direction to apply pressure to the first motor.

6. A machine according to claim 5 in which said port communicates with one working chamber of the first motor, and the opposed working chamber of said first motor is of smaller effective area than said one chamber, whereby in the presence of fluid under pressure in said opposed chamber holding the piston of the first motor in one limit position, the piston may be moved to the opposite limit position upon opening of said port.

7. A machine according to claim 1 in which the guide is movable on the support on an anti-friction bearing, the head has friction bearing support on the guide, and the first motor is adapted to exert a force in said one direction sufficient to overcome the resistance imposed by said anti-friction bearing but insufficient to overcome that of the friction bearing.

8. A machine according to claim 1 in which said head is adjustable along said guide relative to the second motor to adapt the machine for gears of different sizes.

9. A machine having a pair of spindles each adapted to support one gear of a pair to be run together on the machine, and means supporting one spindle for motion relative to the other in one direction, to bring the gear carried thereby into a position of mesh with the other gear, and in the opposite direction, away from said position of mesh, said means comprising a support, a spindle head journaling said one spindle and movable on the support in said directions, a cylinder member movable on the support in said directions, a first piston reciprocable in the cylinder member and connected to the head for moving the latter on the support, a second piston reciprocable in the cylinder member and constituting a stop for variably limiting the stroke of the first piston in the cylinder member in said one direction, yieldable means for urging motion of the cylinder member on the support in said one direction, means for clamping the cylinder to the support, the second piston being operable by fluid pressure to retract the head on the support after the head has been moved to its limit position in said one direction by fluid pressure applied to the first piston and the clamping means have then been applied.

10. A machine according to claim 9 in which the connection between the first piston and the head is adjustable in the direction of motion of the piston, said connection comprising a screw rotatable in said first piston and screw threaded to said head.

11. A machine according to claim 9 in which there are means to adjust the stroke of the second piston relative to said cylinder member.

12. A machine according to claim 9 in which said yieldable means comprises a fluid pressure operable cylinder-piston device.

13. A machine according to claim 9 in which there is a centering device operable to bring cylinder member to and hold it in a predetermined position intermediate of the limits of its motion on the support, and an indicator gage adapted to show the magnitude of a displacement of the cylinder member from said position.

14. A machine having a pair of spindles each adapted to support one gear of a pair to be run together on the machine, and means supporting one spindle for motion relative to the other in one direction, to bring the gear carried thereby into a position of mesh with the other gear, and in the opposite direction, away from said position of mesh, said means comprising a support, a guide movable on the support in said directions by a piston reciprocable in a cylinder on the support, a spindle head journaling said one spindle and movable on the support in said directions by a second piston which is connected to the head and is reciprocable in a second cylinder mounted for limited movement on the support, a third piston reciprocable in the second cylinder and constituting a stop for limiting the stroke of the second piston in said one direction, reversing valve means for applying pressure to the second piston either for moving the head in said one direction to such limit position or in the opposite direction, means for applying pressure to the first piston to hold the guide in one limit position, means operable upon approach of the second piston to said limit position thereof for applying an opposing pressure to the first piston to move the guide in said one direction away from said limit position thereof, a clamp operable to secure the second cylinder to the support, and means for applying pressure to the third piston for causing it to move the second piston and the head in said opposite direction after said clamp has been applied.

15. A machine according to claim 14 in which the second piston is connected to the head by a screw that is rotatable to adjust the head along the guide relative to the second piston.

16. A machine according to claim 15 in which there is a means to adjust the stroke of the third piston in the second cylinder.

References Cited in the file of this patent
UNITED STATES PATENTS

| | | |
|---|---|---|
| 2,582,408 | Bauer | Jan. 15, 1952 |
| 2,961,873 | Carlsen | Nov. 29, 1960 |
| 3,069,813 | Bauer et al. | Dec. 25, 1962 |